United States Patent [19]
Adams et al.

[11] 4,136,933
[45] Jan. 30, 1979

[54] LIQUID CRYSTAL ALIGNMENT FILM BIREFRINGENCE COMPENSATION

[75] Inventors: James E. Adams; Werner E. L. Haas, both of Webster; Gary A. Dir, Fairport, all of N.Y.

[73] Assignee: Xerox Corporation, Stamford, Conn.

[21] Appl. No.: 792,615

[22] Filed: May 2, 1977

[51] Int. Cl.² .................................................. G02F 1/13
[52] U.S. Cl. ..................................... 350/341; 350/157
[58] Field of Search ............... 350/337, 341, 157, 335, 350/339

[56] References Cited
U.S. PATENT DOCUMENTS

| | | | |
|---|---|---|---|
| 3,506,333 | 4/1970 | Land | 350/157 |
| 3,881,808 | 5/1975 | Gurtler et al. | 350/335 |
| 3,944,331 | 3/1976 | Janning | 350/335 |

OTHER PUBLICATIONS

Crossland: "Birefringence in Silicon Monoxide Films used for Aligning Liquid Crystal Lazers," *Applied Physics Letters*, vol. 26, pp. 598-600, Jun. 1, 1975.

*Primary Examiner*—Edward S. Bauer

[57] ABSTRACT

Alignment films provided on a supportive substrate in accordance with the Janning technique exhibit birefringence wherein plane polarized light in passing through the alignment film becomes elliptically polarized. Birefringence compensation is provided by depositing a second alignment film on the other side of the supportive substrate in a direction substantially orthogonal to the deposition direction of the first alignment film, the second alignment film having a thickness substantially equal to that of the first alignment film.

5 Claims, 3 Drawing Figures

LIQUID CRYSTAL ALIGNMENT FILM BIREFRINGENCE COMPENSATION

BACKGROUND OF THE INVENTION

This invention relates to liquid crystalline electro-optic cells and, more particularly, to contrast enhancement of such cells employing an alignment film provided in accordance with the Janning technique.

The Janning technique, generally speaking, comprises vacuum depositing and alignment materials such as platinum, gold, tin, lead, aluminum, copper, silver, silicon monoxide, or chromium onto a supportive substrate at a chosen angle (typically about 80°) to the normal to the substrate. In this manner, an alignment film is created having film growth oriented in a direction which makes an acute angle to the substrate. See, for example, U.S. Pat. Nos. 3,834,792 and 3,944,331, both to Janning, hereby expressly incorporated by reference. As stated in these patents, the alignment film aligns liquid crystal molecules of a liquid crystalline material when the liquid crystalline material is placed on the alignment film.

These alignment films can be used in accordance with the aforementioned U.S. Pat. No. 3,944,331 to provide a nematic liquid crystalline material in a twisted nematic structure. A typical resulting cell has the nematic liquid crystalline material sandwiched between two electroded supporting substrates and in contact with an aligning film on the inner surface of each substrate. The alignment film coated substrates are then oriented so that the alignment direction of the nematic liquid crystalline material in contact with one alignment film is substantially orthogonal to the alignment direction of the nematic liquid crystalline material in contact with the other alignment film. Since the molecules of the nematic liquid crystalline material in contact with each of the alignment films is oriented by the films in directions substantially orthogonal to one another the molecules of the nematic liquid crystalline material in contact with one alignment film are rotated substantially 90° from the molecular alignment of the molecules in contact with the other alignment film. In this manner, the twisted nematic structure is provided.

It has been found that the alignment film is itself birefringent, produces a conoscopic pattern, and depolarizes off axis light. This birefringence is additive to that of the liquid crystalline material. However, when the liquid crystal material is rendered homeotropic by application of an electrical field (the helical orientation of the liquid crystalline material is broken and the molecules are aligned substantially parallel to one another due to the electrical field) the birefringence remains, limiting contrast and is therefore an undesirable effect.

Accordingly, it is desirable to provide a solution which neutralizes or compensates for this birefringence of the alignment film.

SUMMARY OF THE INVENTION

It is, therefore, an object of this invention to neutralize or compensate for the birefringence of alignment films deposited in accordance with the Janning technique.

The above mentioned object and advantages and others are realized in accordance with the invention by treating each substrate to be utilized not only with an alignment film with which the liquid crystalline material is to be contacted but also to provide the substrate on its other side with a second film, of substantially equal thickness to that of the first film, but deposited in a direction substantially orthogonal to the direction of the first alignment film. Plane polarized light striking the first alignment film and passing into the supporting substrate is converted by the birefringence of the first alignment film into elliptically polarized light. This elliptically polarized light in passing through the second alignment film on the other side of the substrate is also effected by the birefringence effect of the second alignment film but emerges as plane polarized light oriented in the same direction as the originally incident light. This occurs because the birefringence effects of the second alignment film compensates for the birefringence effect of the first alignment film, since the two alignment films are substantially equal in thickness, are deposited in directions substantially orthogonal to one another, and have resulting film growth alignment orientations which are rotated substantially 90° from one another. By the practice of the present invention, plane polarized light is restored to its state of plane polarization prior to passing through the liquid crystalline material and undergoing electro-optical effects provided by operating the electro-optical cell. For example, in the twisted nematic cell, the application of an applied electrical field will break up the helical structure of the nematic molecules and cause the molecules subjected to the applied electrical field to align substantially parallel to one another. Liquid crystalline material having positive dielectric anisotropy will align substantially parallel to the applied electrical field whereas materials having negative dielectric anisotropy will align substantially orthogonal to the direction of the applied electrical field. Light passing through the helically oriented molecules of the liquid crystalline material in the twisted nematic state has its direction of polarization rotated whereas light passing through the molecules subjected to the applied electrical field is not rotated. In twisted nematic devices, this difference in the optical activity of the liquid crystalline material caused by the applied electrical field is exploited to produce an image. Ideally, the plane of polarization of the light passing through the liquid crystalline material in the twisted nematic structure emerges from the cell in a direction substantially parallel to the polarization direction of the linear polarizer through which the cell is viewed. On the other hand, light emerging from the cell through portions of the liquid crystalline material subjected to the applied electrical field emerges in a direction substantially orthogonal to the polarization direction of the linear analyzer. Thus, areas of the liquid crystalline material subjected to the applied electrical field will appear dark through the linear analyzer whereas portions of the liquid crystalline remaining in the twisted nematic state will appear light. In present cells, if the plane of polarization of plane polarized light is neither parallel nor perpendicular to the alignment direction, then plane polarized light is altered in its polarization and good contrast is not observed.

This is caused, in no small degree, by the birefringence of aligning films produced by the Janning technique.

In accordance with the practice of the present invention, the birefringence effects of the alignment layers are compensated so that initially incident plane polarized light passes through the liquid crystalline material as plane polarized light rather than as elliptically polarized light.

The invention will be more fully understood from the following detailed description of the preferred embodiment thereof, particularly when read in conjunction with the accompanying drawings wherein:

FIG. 1 is a schematic illustration of a supportive substrate having two alignment films provided in accordance with the present invention.

FIG. 2 schematically illustrates the behavior of plane polarized light passing through the device of FIG. 1.

FIG. 3 is a schematic illustration of an electro-optic cell having two supportive substrates, each supportive substrate bearing two alignment films in accordance with the present invention.

DETAILED DESCRIPTION OF THE PREFERRED EMBODIMENTS

Figure 1:
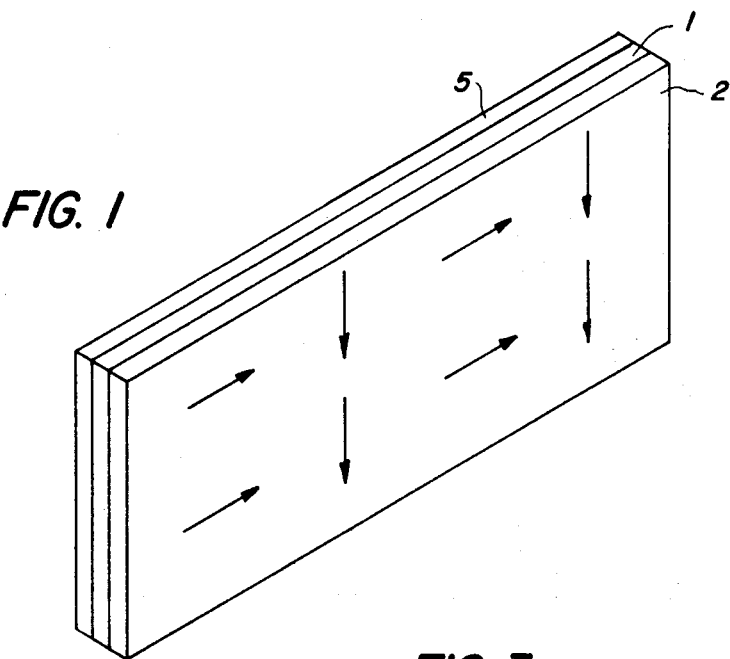
Figure 2:
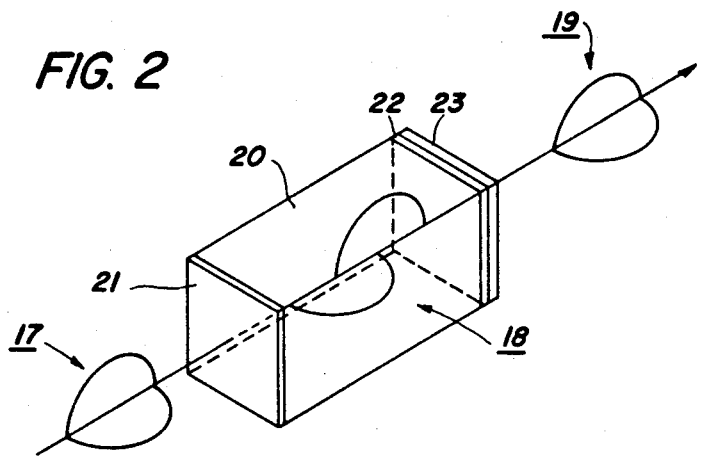

Referring now to FIG. 1, there is seen a schematic illustration of a supportive substrate having two alignment films provided therein in accordance with the Janning technique. Each of the alignment film is deposited in a direction substantially orthogonal to each other. This is illustrated by the directional arrows in FIG. 1. Suitable materials, process parameters and deposition techniques are disclosed in U.S. Pat. No. 3,834,792 hereby expressly incorporated by reference. As shown in FIG. 1, supportive substrate 1 has alignment film 4 on one side and alignment film 5 on the other side. Alignment films 4 and 5 are deposited in accordance with the Janning technique. Referring to FIG. 2, an incident beam of plane polarized light 17 enters a supportive substrate 20 having an alignment film 21, electrode 22 and alignment film 23. Alignment film 21 is deposited in a direction substantially orthogonal to the deposition direction of alignment film 23. In passing through alignment film 21, beam 17 of plane polarized light is transformed into elliptically polarized light 18 by virtue of the birefringence effects of film 21. Elliptically polarized light 18 undergoes the birefringence effects of film 23 and emerges as plane polarized light 19 having a direction of plane polarization substantially identical to that of incident beam 17. Alignment films 21 and 23 are substantially equal in thickness and are deposited by the Janning technique in directions substantially orthogonal to one another. Because of these two conditions, the birefringence effects of one film compensate for those of the other film, and this is why, in FIG. 2, the direction of polarization of light beam 19 is substantially identical to that of incident light beam 17 notwithstanding intermediate elliptical polarization 18.

Figure 3:
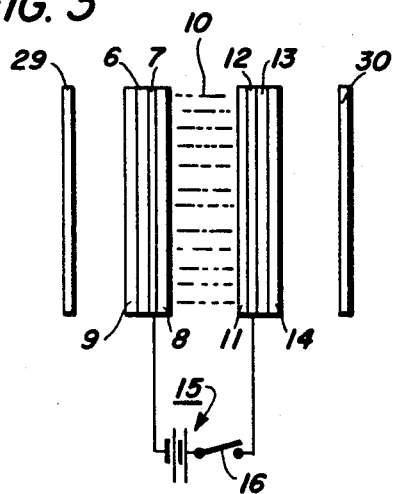

Referring now to FIG. 3, there is seen a liquid crystalline electro-optic cell suitable for viewing in transmission. Transparent support of substrate 6 has an alignment coating 9 on one side and transparent electrode 7 of conductive material well known in the art on the other side. Electrode 7 is overcoated with an alignment film 8. The direction of deposition of alignment films 8 and 9 are substantially orthogonal to one another. In a similar manner, transparent support substrate 13 is provided with an alignment film 14 on one side, electrode 12 of conductive material on the other side, and alignment film 11 overcoating electrode 12. Sandwiched between alignment films 8 and 11 is layer 10 of liquid crystalline material. Voltage source 15 is electrically connected through switch 16 between electrodes 7 and 12. It is to be noted that alignment films 8 and 11 are oriented to provide a twisted nematic structure. With a nematic liquid crystalline material for liquid crystalline layer 10, the nematic liquid crystalline material assumes the helical twisted nematic state. Thus, FIG. 3 is illustrative of the practice of the present invention as applied to a twisted nematic cell to be viewed in transmission. Moving from left to right in FIG. 3, plane polarized light passing through alignment film 9 becomes elliptically polarized due to the birefringence effects of alignment film 9 and is propagated as elliptically polarized light through transparent supportive substrate 6 and electrode 7. The propagating elliptically polarized light, in passing through alignment film 8, undergoes the compensating birefringence effects of alignment film 8 and emerges from film 8 into liquid crystalline layer 10 as plane polarized light having a direction of plane polarization substantially identical to the incident beam of light striking film 9. The plane polarized light has its direction of plane polarization rotated by layer 10 in portions of layer 10 which are in the twisted nematic state, due to the optical activity of the helical structure of the twisted nematic state. The rotated plane polarized light, in passing through alignment film 11, is converted to elliptically polarized light due to the birefringence of alignment film 11 and is propagated through electrode 12 and transparent supportive substrate 13 as elliptically polarized light. In passing through alignment film 14, the elliptically polarized light propagating through electrode 12 and supportive substrate 13 undergoes the compensating birefringence effects of alignment film 14 and emerges from film 14 as plane polarized light having a direction of plane polarization substantially identical to that of the incident beam of light. As previously mentioned, the incident beam of light is plane polarized and such plane polarization can be conveniently provided from any light source by utilizing a linear polarizer 29. Also, as previously mentioned, the difference between imagewise aligned portions of liquid crystalline layer 10 caused by the application of an electrical field and portions of layer 10 remaining in the twisted nematic state are readily discernible by viewing an analyzer 30. Polarizer 29 and analyzer 30 can conveniently comprise material commercially available from Polaroid Corporation as is well known. The polarization directions of polarizer 29 and analyzer 30 are oriented substantially orthogonal to one another so that incident plane polarized light is rotated substantially 90° by portions of layer 10 in the twisted nematic state and strike analyzer 30 in a direction substantially parallel to the polarization direction of analyzer 30. In this way, the twisted nematic portions of layer 10 appear bright to the observer whereas light passing through aligned portions of layer 10 are not rotated and strike analyzer 30 at approximately 90° to the polarization direction of analyzer 30. Therefore, aligned portions of layer 10 appear dark to the observer. It will be appreciated of course that, if one desired, aligned portions can constitute background areas of the image and twisted nematic portions of layer 10 can constitute the imagewise configured regions of the image. Thus, if one wishes, the applied field can be applied in a configuration corresponding to either image or background, depending upon whether one wishes to view a dark image on a light background as is done in most twisted nematic liquid crystal displays presently on the market, or if one wishes to view a light image on a dark background. It will be appreciated that one or both of electrodes 7 and 12 in FIG. 3 can be provided in imagewise configuration such as a number or a letter in the alphabet or X-Y matrix addressing can be employed. It would be further appreciated, in view of the state of the art, that one can insert a photoconductive layer into the cell to allow optical address.

The embodiment depicted in FIG. 3 can be made suitable for viewing in reflection by adding a reflective member, such as a mirror, to the left of polarizer 29 in FIG. 3.

While the invention has been described in detail with respect to various preferred embodiments thereof, it is not intended to be limited thereto but rather it would be appreciated by those skilled in the art that modifications and variations are possible which are within the spirit of the invention and the scope of the claims. For example, the advantageous use of the present invention is not limited to nematic liquid crystalline materials, but can be used also with cholesterics, smectics, mixtures of cholesterics and smectics, mixtures of cholesterics and nematics, and optically active and non-optically active materials.

What is claimed is:

1. A birefringence compensated member, comprising: a supportive substrate; an alignment film on one side of said supportive substrate vacuum evaporated in a first direction; and, a second alignment film on the other side of said supportive substrate vacuum evaporated in a second direction, said first and second directions being substantially orthogonal to one another.

2. In a liquid crystal display cell of the type having a supportive substrate, an alignment film on one side of said supportive substrate vacuum evaporated in a first direction, and a liquid crystal material in contact with said alignment film, the improvement comprising: a second alignment film on the other side of said supportive substrate vacuum evaporated in a second direction, said first and second directions being substantially orthogonal to one another.

3. The display cell of claim 2 further including on the free side of said liquid crystal material a second supportive substrate having an alignment film on each side thereof, said alignment films on each side of said second supportive substrate having been vacuum evaporated in directions substantially orthogonal to one another.

4. The display cell of claim 3 wherein each of said supportive substrates are transparent.

5. The display cell of claim 4 further including a transparent layer of conductive material between said second supportive substrate and said liquid crystalline material.

* * * * *